J. W. WEBB.
PLOW.
APPLICATION FILED APR. 4, 1911.
1,008,505.
Patented Nov. 14, 1911.
SHEETS—SHEET 1.
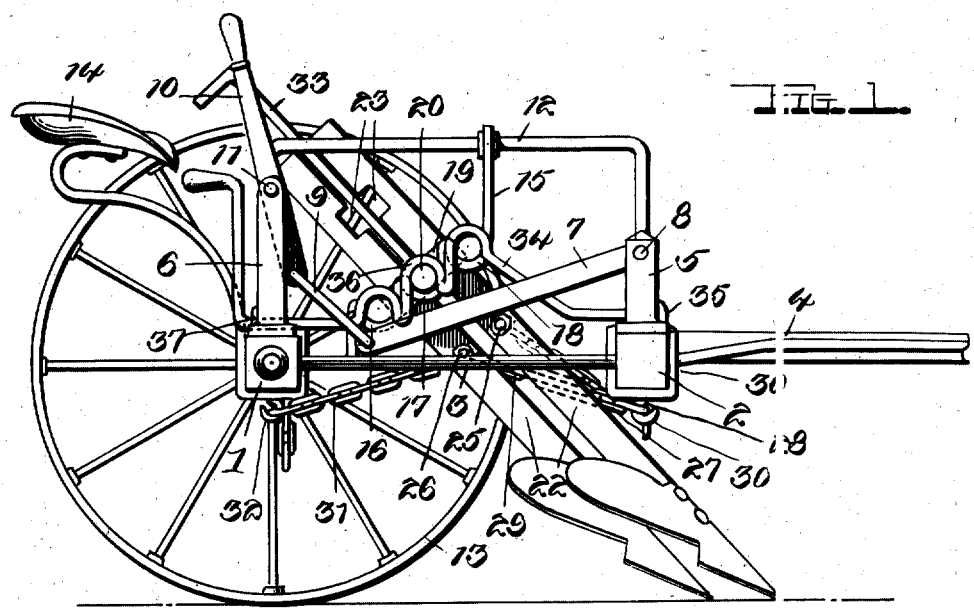
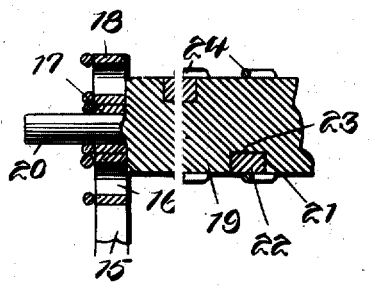
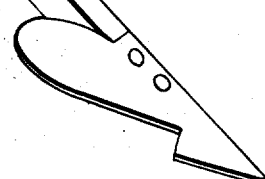
Witnesses
Alex. L. Grieshaber.
L. H. Ellis.
Inventor
J. W. Webb.
By Watson E. Coleman.
Attorney
COLUMBIA PLANOGRAPH CO., WASHINGTON, D. C.

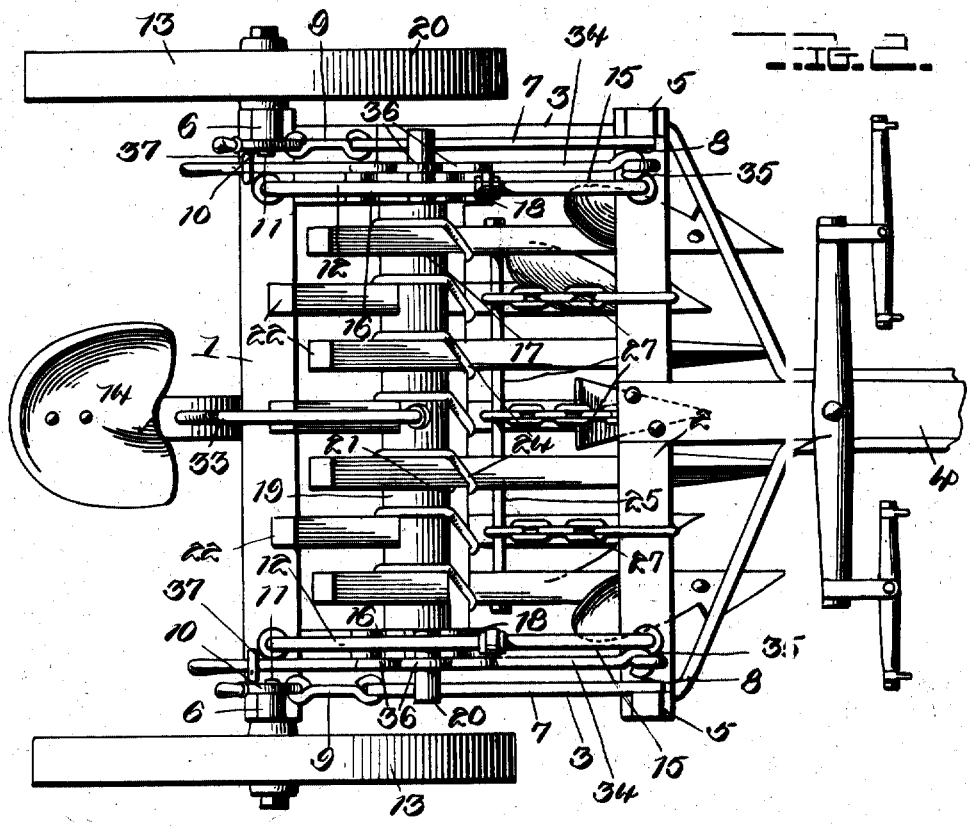

UNITED STATES PATENT OFFICE.

JACOB WALKER WEBB, OF HOLCOMB, MISSISSIPPI, ASSIGNOR OF ONE-HALF TO ROBERT DOUGLASS WILLIAMS, OF HOLCOMB, MISSISSIPPI.

PLOW.

1,008,505.  Specification of Letters Patent.  Patented Nov. 14, 1911.

Application filed April 4, 1911. Serial No. 618,860.

*To all whom it may concern:*

Be it known that I, JACOB WALKER WEBB, a citizen of the United States, residing at Holcomb, in the county of Grenada and State of Mississippi, have invented certain new and useful Improvements in Plows, of which the following is a specification, reference being had to the accompanying drawings.

This invention is an improved wheeled cultivator plow which may be used for all the purposes of a cultivator plow, and cultivating crops of all kinds at all periods of growth, the invention consisting in the construction, combination and arrangement of devices, hereinafter described and claimed.

In the accompanying drawings—Figure 1 is a side elevation of a wheeled plow constructed in accordance with my invention, the near wheel being removed; Fig. 2 is a plan of the same; Fig. 3 is a partial transverse sectional view of the same; Fig. 4 is a detail perspective view of the plow beam; and Fig. 5 is a detail perspective view of one of the cultivating elements.

The frame of my improved wheeled cultivator plow comprises the axle 1, the front cross beam 2, and a pair of side rods 3, which connect the axle and the cross beam and have their front ends in-turned and secured to opposite sides of the tongues 4. A pair of vertical posts 5, rise from the ends of the cross beam 2, and a pair of similar posts 6, are secured to the axle at the ends thereof, and rise therefrom.

Link levers 7 have their front ends pivotally connected to the upper ends of the posts 5, as at 8. Their rear ends are connected by rods 9, to the front ends of lifting levers 10, the said lifting levers being fulcrumed as at 11, to the posts 6, near the upper ends of the latter. The front cross bar 2 is also connected to the axle 1, by a pair of longitudinally disposed arch bars 12. The axle is provided with supporting wheels 13, on its spindles and is also provided with a seat 14 for the driver. The axle is provided with a pair of forwardly and upwardly extending inclined supporting arms 15, each of which is provided with a series of bearings 16, 17, 18, each of which is progressively at a higher elevation than the one to the rear thereof, and the said bearings are open on their upper sides. I also provide a plow beam 19, which is disposed transversely of the frame, and is provided at its ends with spindles 20, which may be engaged with the bearings 16, 17, 18, as the case may be, according to the desired adjustment of the plow The said plow beam is provided on its front and rear sides with notches 21, of which there may be any required number, and the notches on the front and rear sides of the plow beam may be disposed either in line or in alternate relation as the case may be, according to the desired number and the kind of plow implements to be used in connection with the beam. I do not desire to limit myself, as to this particular, but reserve the right to employ any desired number and any desired kind of implements in connection with my plow beam, according to the nature of the work to be done, and the kind of crop to be cultivated.

The standards 22 of the plow or cultivator implements, are provided each on one side with a series of notches 23. Two sets of the standards are employed in connection with the notched beam 19, one set of the standards being on the front side of said beam, and the other set on the rear side thereof, and hence the notches of the front standards are on their rear sides while those of the rear standards are on their front sides. By thus providing the beam 19 and the implement standards with notches for engagement with one another, the implement standards may be attached to the beam at any required vertical adjustment as will be understood. The standards are secured to the beam not only by their co-engaging notches, but also by suitable clip bolts 24, which pass around the notched plow beam and also pass around the standards. The front series of plow or cultivator standards are connected together, at a suitable distance from their lower ends by a cross bar 25. The rear series of standards are connected together by a similar cross bar 26.

It will be understood that the standards are in spaced relation. Forwardly extending chains or rods 27 are attached to the cross bar 25, and may be secured at any desired adjustment to the front cross bar 2 of the frame, by means of hook bands 28, with which the said cross bar 2 is provided. Similar chains or rods 29 also extend forwardly from the cross rod 26 and may be connected at any desired adjustment to the said cross bar 2, by means of hook bands 30. The said cross rod 26 is also provided with rearwardly extending chains or rods 31 which may be connected at any desired adjustment to the axle 1, by means of similar hook bands 32. Hence when the spindles of the plow beam are mounted in any pair of the bearings 16, 17, 18, the said chains or rods 27, 29, 31, enable the plow standards to be secured at any desired inclination, the said chains or rods also enabling the plow beam with its standards and implements, to be raised or lowered and disposed in any pair of the bearings that may be desired according to the depth it is desired that the implements will operate in the ground, and also according to the length of the plow standards.

In practice, I am providing two or more of the plow standards for use in connection with each machine, and provided with varying numbers of notches for the reception of the plow standards according to the desired number of plow standards to be used in connection with the machine. The beam 19 is provided with a lifting bar 33.

The spindles 20 of the plow beam 19 project across and above the link levers 7. Hence by operating the link levers by means of the lifting levers 10, the plow beam may be raised or lowered so that its spindles may be engaged with any pair of the bearings 16, 17 and 18, the lifting bar 33 facilitating the moving or shifting of the plow beam when thus adjusting the same. After the plow beam has been thus disposed with its spindles 20 engaged with one pair of the adjusting bearings, it is locked in such position by means of a pair of lock bars 34, each of the said lock bars being pivotally connected as at 35, to the cross beam 2 of the frame, and provided with a series of loops 36 for engagement with the spindles 20, according to the position of the beam 19, the rear ends of the said locking bars being engaged with suitable keepers 37 which are disposed on the upper side of the axle. The locking bars have their rear ends up-turned to form vertical arms 34ᵃ and 34ᵇ.

While I have herein shown and described what I now regard as a preferred embodiment of my invention, I would have it understood that minor changes in the form, proportion and construction of the several parts may be made without departing from the spirit of my invention as defined by the appended claims.

I claim:—

1. In a plow of the class described, the combination of a wheeled frame having a pair of longitudinally disposed supporting arms at its sides provided with adjusting bearings, the said bearings being disposed one in advance of another, a plow beam disposed transversely of the frame and having spindles to engage in said bearings and mount the beam for axial movement therein, implement standards connected to and carried by the beam and means to adjust and shift the plow beam.

2. In a plow of the class described, the combination of a wheeled frame having supporting elements at its sides each provided with a series of bearings arranged one in advance of another and at different elevations, a plow beam disposed transversely of the frame and having spindles to engage the bearings and mount the beam therein for axial movement and levers to raise and lower the beam and enable the same to be engaged with any desired bearings.

3. In a plow of the class described, the combination of a wheeled frame provided with supporting elements, each having a series of bearings, a plow beam disposed transversely of the frame and having spindles for engagement with any of the bearings, link levers mounted on the frame and disposed under the spindles of the plow beam, and lifting levers also mounted on the frame and connected to the link levers to operate the latter.

4. In a plow of the class described the combination of a wheeled frame provided with supporting elements, each having a series of bearings, a plow beam disposed transversely of the frame, and having spindles for engagement with any of the bearings, link levers mounted on the frame, and disposed under the spindles of the plow beam, lifting levers also mounted on the frame and connected to the link levers to operate the latter, and locking bars pivotally connected to the frame and having means to engage the spindles of the beam and secure the beam at any desired adjustment in the bearings.

5. In a plow of the class described, the combination of a wheeled frame provided with supporting elements, each having a series of bearings, a plow beam disposed transversely of the frame and having spindles for engagement with any of the bearings, link levers mounted on the frame and disposed under the spindles of the plow beam, lifting levers also mounted on the frame and connected to the link levers to operate the latter, and locking bars pivotally connected to the frame and having means to engage the spindles of the beam and secure the beam at any desired adjustment in the bearings, the said beam being provided with a lifting bar.

In testimony whereof I hereunto affix my signature in the presence of two witnesses.

JACOB WALKER WEBB.

Witnesses:
WHITFIELD KING,
J. H. BROM.

---

Copies of this patent may be obtained for five cents each, by addressing the "Commissioner of Patents, Washington, D. C."